(12) United States Patent
Kato (10) Patent No.: US 8,183,951 B2
(45) Date of Patent: May 22, 2012

(54) MODULATOR

(75) Inventor: Takashi Kato, Saitama (JP)

(73) Assignee: Advantest Corporation, Tokyo (JP)

( * ) Notice: Subject to any disclaimer, the term of this patent is extended or adjusted under 35 U.S.C. 154(b) by 471 days.

(21) Appl. No.: 12/296,492

(22) PCT Filed: Apr. 10, 2007

(86) PCT No.: PCT/JP2007/058225
§ 371 (c)(1),
(2), (4) Date: Sep. 30, 2009

(87) PCT Pub. No.: WO2007/123072
PCT Pub. Date: Nov. 1, 2007

(65) Prior Publication Data
US 2010/0026407 A1 Feb. 4, 2010

(30) Foreign Application Priority Data

Apr. 17, 2006 (JP) .................................. 2006-113578

(51) Int. Cl.
*H04L 27/36* (2006.01)
(52) U.S. Cl. ...................... 332/123; 375/296; 455/114.2
(58) Field of Classification Search ................ 332/123; 375/296; 455/114.2
See application file for complete search history.

(56) References Cited

U.S. PATENT DOCUMENTS

| 4,509,208 A | 4/1985 | Sogo et al. | |
|---|---|---|---|
| 4,835,488 A | 5/1989 | Garuts | |
| 5,293,406 A | 3/1994 | Suzuki | |
| 6,359,523 B1 * | 3/2002 | Kuwano | 332/103 |
| 6,396,330 B1 | 5/2002 | Fujii | |
| 2003/0001677 A1 | 1/2003 | Taniguchi et al. | |
| 2003/0007377 A1 | 1/2003 | Otaka | |
| 2004/0184559 A1 | 9/2004 | Ballantyne | |

(Continued)

FOREIGN PATENT DOCUMENTS

CN 1397106 2/2003

(Continued)

OTHER PUBLICATIONS

Japan Office action, mail date is Mar. 14, 2007.

(Continued)

*Primary Examiner* — James E Goodley
(74) *Attorney, Agent, or Firm* — Greenblum & Bernstein, P.L.C.

(57) ABSTRACT

It is possible to restrain distortions generated in a mixer. A modulator includes a local signal source that generates an in-phase local signal, a multiplier that multiplies an in-phase baseband signal (I) and the in-phase local signal by each other, a phase inverter that receives the in-phase local signal from the local signal source, and inverts the phase thereof, an anti-phase multiplier that multiplies an anti-phase baseband signal (−I) (signal equivalent to a signal obtained by inverting the phase of the in-phase baseband signal (I)) and an output from the phase inverter (anti-phase local signal) by each other, and an adder that adds an output from the multiplier and an output from the anti-phase multiplier to each other. The addition by the adder of a leak component (carrier leak) which is the in-phase local signal leaked from the multiplier, and the signal which is the output from the phase inverter leaked from the anti-phase multiplier to each other results in zero. In other words, the leak component output from the multiplier is cancelled.

2 Claims, 8 Drawing Sheets

U.S. PATENT DOCUMENTS

| | | |
|---|---|---|
| 2005/0101267 A1 | 5/2005 | Smithson |
| 2006/0133537 A1 | 6/2006 | Kato |
| 2007/0030922 A1 | 2/2007 | Kato |
| 2007/0140378 A1 | 6/2007 | Kato |
| 2010/0026407 A1 | 2/2010 | Kato |

FOREIGN PATENT DOCUMENTS

| | | |
|---|---|---|
| JP | 58-173906 A | 10/1983 |
| JP | 1-221905 | 9/1989 |
| JP | 2-124608 A | 5/1990 |
| JP | 2-151107 A | 6/1990 |
| JP | 8-186449 A | 7/1996 |
| JP | 8-204460 | 8/1996 |
| JP | 9-172465 A | 6/1997 |
| JP | 10-313261 | 11/1998 |
| JP | 11-41129 | 2/1999 |
| JP | 2000-59146 | 2/2000 |
| JP | 2000-357924 | 12/2000 |
| JP | 2001-127555 | 5/2001 |
| JP | 2003-17944 | 1/2003 |
| JP | 2004-343325 | 12/2004 |
| JP | 2007-288513 | 11/2007 |
| TW | 200507553 | 2/2005 |
| WO | 02/45254 | 6/2002 |
| WO | 2005/027449 | 3/2005 |

OTHER PUBLICATIONS

China Office action, dated Nov. 11, 2010 along with an english translation thereof.

* cited by examiner

MODULATOR

TECHNICAL FIELD

The present invention relates to restraint of distortions generated in a mixer.

BACKGROUND ART

Conventionally, mixers (multipliers) have been used for a modulator and the like (refer to WO 2005/27449 pamphlet, for example). The mixer multiplies two input signals by each other, and outputs a result of the multiplication.

However, there may be generated distortions such as a second-order distortion (carrier leak) in an output from the mixer.

It is therefore an object of the present invention to restrain the distortions from being generated in the output from the mixer.

DISCLOSURE OF THE INVENTION

According to the present invention, a modulator includes: a multiplying unit that multiplies an in-phase baseband signal and an in-phase local signal by each other; an anti-phase leak component output unit that outputs, based on the in-phase local signal, an anti-phase leak component equivalent to a signal obtained by inverting the phase of a leak component which is the in-phase local signal leaked from the multiplying unit; and an adding unit that adds an output from the multiplying unit and an output from the anti-phase leak component output unit to each other.

According to the thus constructed modulator, a multiplying unit multiplies an in-phase baseband signal and an in-phase local signal by each other. An anti-phase leak component output unit outputs, based on the in-phase local signal, an anti-phase leak component equivalent to a signal obtained by inverting the phase of a leak component which is the in-phase local signal leaked from the multiplying unit. An adding unit adds an output from the multiplying unit and an output from the anti-phase leak component output unit to each other.

According to the modulator of the present invention, the anti-phase leak component output unit may include: a phase inverting unit that inverts the phase of the in-phase local signal; and an anti-phase multiplying unit that multiplies a predetermined signal and an output from the phase inverting unit by each other; and a leak characteristic of the anti-phase multiplying unit may be identical with a leak characteristic of the multiplying unit.

According to the modulator of the present invention, the predetermined signal may be an anti-phase baseband signal equivalent to a signal obtained by inverting the phase of the in-phase baseband signal.

According to the modulator of the present invention, the anti-phase leak component output unit may include: an anti-phase multiplying unit that receives the in-phase local signal and multiplies the received in-phase local signal and a predetermined signal by each other; and a phase inverting unit that inverts the phase of an output from the anti-phase multiplying unit; and a leak characteristic of the anti-phase multiplying unit may be identical with a leak characteristic of the multiplying unit.

According to the modulator of the present invention, the predetermined signal may be an anti-phase baseband signal equivalent to a signal obtained by inverting the phase of the in-phase baseband signal.

According to the present invention, the modulator may include a first current adding unit that adds a predetermined current to the in-phase baseband signal.

According to the present invention, the modulator may include: a first current adding unit that adds a predetermined current to the in-phase baseband signal; and a second current adding unit that adds a current equivalent in magnitude to the predetermined current to the predetermined signal.

According to the modulator of the present invention, the in-phase baseband signal may include an in-phase baseband I signal and an in-phase baseband Q signal; the multiplying unit may include: a multiplying unit for I signal that receives the in-phase baseband I signal; and a multiplying unit for Q signal that receives the in-phase baseband Q signal; and the anti-phase leak component output unit may include: an anti-phase I leak component output unit that outputs an anti-phase I leak component equivalent to a signal obtained by inverting the phase of an I leak component which is the in-phase local signal leaked from the multiplying unit for I signal; and an anti-phase Q leak component output unit that outputs an anti-phase Q leak component equivalent to a signal obtained by inverting the phase of a Q leak component which is the in-phase local signal leaked from the multiplying unit for Q signal.

According to the modulator of the present invention, the in-phase baseband signal may include an in-phase baseband I signal and an in-phase baseband Q signal; the anti-phase baseband signal may include an anti-phase baseband I signal and an anti-phase baseband Q signal; the multiplying unit may include: a multiplying unit for I signal that receives the in-phase baseband I signal; and a multiplying unit for Q signal that receives the in-phase baseband Q signal; and the anti-phase leak component output unit may include: an anti-phase I leak component output unit that outputs an anti-phase I leak component equivalent to a signal obtained by inverting the phase of an I leak component which is the in-phase local signal leaked from the multiplying unit for I signal; and an anti-phase Q leak component output unit that outputs an anti-phase Q leak component equivalent to a signal obtained by inverting the phase of a Q leak component which is the in-phase local signal leaked from the multiplying unit for Q signal.

BEST MODE FOR CARRYING OUT THE INVENTION

A description will now be given of embodiments of the present invention with reference to drawings.

First Embodiment

Figure 1:
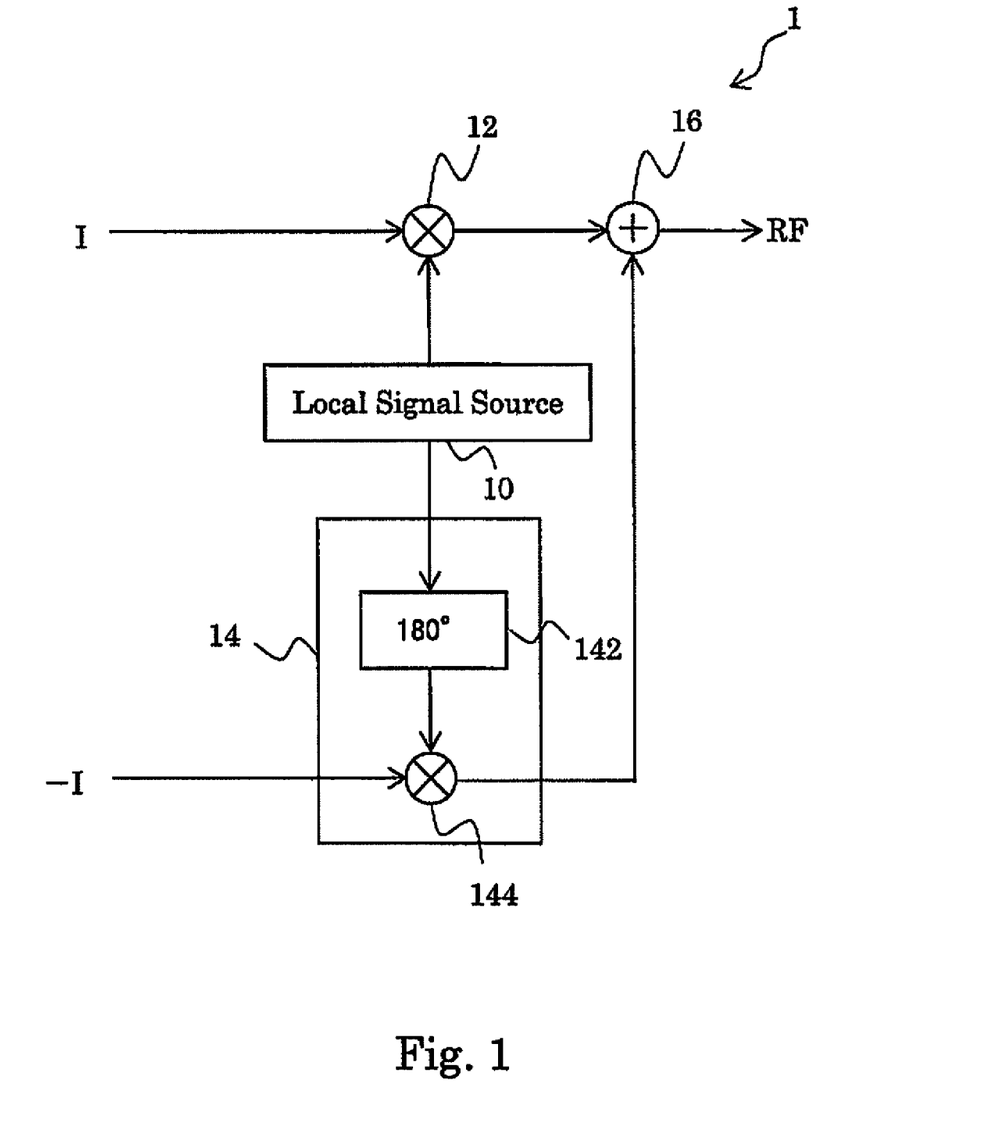
FIG. 1 is a diagram showing a configuration of a modulator 1 according to a first embodiment.

FIG. 1 is a diagram showing a configuration of a modulator 1 according to a first embodiment. The modulator 1 includes a local signal source 10, a multiplier 12, an anti-phase leak component output unit 14 and an adder 16.

The local signal source 10 outputs an in-phase local signal.

The multiplier 12 receives the in-phase local signal from the local signal source 10. Then, the multiplier 12 receives an in-phase baseband signal I. Moreover, the multiplier 12 multiplies the in-phase baseband signal I and the in-phase local signal by each other. It should be noted that the in-phase local signal leaked from the multiplier 12 is referred to as a leak component (carrier leak).

The anti-phase leak component output unit 14 outputs an anti-phase leak component equivalent to a signal obtained by inverting the phase of the leak component based on the in-phase local signal. The anti-phase leak component output unit 14 includes a phase inverter 142 and an anti-phase multiplier 144.

The phase inverter 142 receives the in-phase local signal from the local, signal source 10. Then, the phase inverter 142 outputs a signal obtained by inverting the phase of the in-phase local signal (referred to as "anti-phase local signal"). The phase inverter 142 is a 180-degree phase shifter, a logic circuit or an amplifier (only an amplifier which inverts the phase is applicable), for example.

The anti-phase multiplier 144 multiplies an anti-phase baseband signal −I and the output (anti-phase local signal) from the phase inverter 142 by each other. It should be noted that the anti-phase baseband signal −I is equivalent to a signal obtained by inverting the phase of the in-phase baseband signal I.

It should be noted that a leak characteristic of the anti-phase multiplier 144 is identical with a leak characteristic of the multiplier 12.

In other words, (1) the signal (leak component) which is the in-phase local signal leaked from the multiplier 12 when the in-phase baseband signal I and the in-phase local signal are fed to the multiplier 12, and (2) the signal which is the in-phase local signal leaked from the anti-phase multiplier 144 when the in-phase baseband signal I and the in-phase local signal are fed to the anti-phase multiplier 144 are the same.

The anti-phase multiplier 144 is realized by forming the multiplier 12 and the anti-phase multiplier 144 as matched-pair mixers which have a monolithic structure and are identical each other in the characteristic.

The adder 16 adds an output from the multiplier 12 and an output from the anti-phase leak component output unit 14 (anti-phase multiplier 144) to each other.

A description will now be given of an operation of the first embodiment.

The local signal source 10 outputs an in-phase local signal. The in-phase local signal is fed to the multiplier 12 and the anti-phase leak component output unit 14.

The multiplier 12 multiplies the in-phase baseband signal I and the in-phase local signal by each other, and outputs the result of the multiplication to the adder 16. On this occasion, the result of the multiplication carried out by the multiplier 12 and the leak component leaked from the multiplier 12 as well are output to the adder 16.

The in-phase local signal is inverted in phase by the phase inverter 142, and is fed to the anti-phase multiplier 144. The anti-phase multiplier 144 multiplies the anti-phase baseband signal −I and the output (anti-phase local signal) from the phase inverter 142 by each other. The result of the multiplication carried out by the anti-phase multiplier 144 is output to the adder 16. On this occasion, the result of the multiplication carried out by the anti-phase multiplier 144 and the signal which is the output from the phase inverter 142 leaked from the anti-phase multiplier 144 as well are output to the adder 16.

The characteristic of the anti-phase multiplier 144 and the characteristic of the multiplier 12 are identical each other. The anti-phase baseband signal −I fed to the anti-phase multiplier 144 is opposite in polarity to the in-phase baseband signal I fed to the multiplier 12. Moreover, the anti-phase local signal fed to the anti-phase multiplier 144 is opposite in polarity to the in-phase local signal fed to the multiplier 12.

Thus, the result of the multiplication carried out by the anti-phase multiplier 144 is the same signal as the result of the multiplication carried out by the multiplier 12.

The characteristic of the anti-phase multiplier 144 and the characteristic of the multiplier 12 are identical each other. Moreover, the anti-phase local signal fed to the anti-phase multiplier 144 is opposite in polarity to the in-phase local signal fed to the multiplier 12.

Thus, the signal obtained by inverting the polarity of the leak component output from the multiplier 12, and the signal which is the output from the phase inverter 142 leaked from the anti-phase multiplier 144 are the same.

The adder 16 adds the output from the multiplier 12 and the output from the anti-phase leak component output unit 14 (anti-phase multiplier 144) to each other.

Since the result of the multiplication carried out by the anti-phase multiplier 144 is the same signal as the result of the multiplication carried out by the multiplier 12, the result of the multiplication carried out by the multiplier 12 is doubled and is output from the adder 16.

The addition by the adder 16 of the leak component output from the multiplier 12 and the signal which is the output from the phase inverter 142 leaked from the anti-phase multiplier 144 to each other results in zero. In other words, the leak component output from the multiplier 12 is cancelled.

According to the first embodiment, a second-order distortion (leak component) in the output of the multiplier 12 can be cancelled by adding the second-order distortion by the adder 16 to the signal which is the output of the phase inverter 142 leaked from the anti-phase multiplier 144.

Moreover, according to the first embodiment, the result of the multiplication carried out by the multiplier 12 is doubled and is output from the adder 16. Therefore, compared with a case in which the anti-phase leak component output unit 14 and the adder 16 are not used, the output of the multiplier 12 can be halved. As a result, the second-order distortion in the output from the multiplier 12 can be reduced.

Second Embodiment

Figure 2:
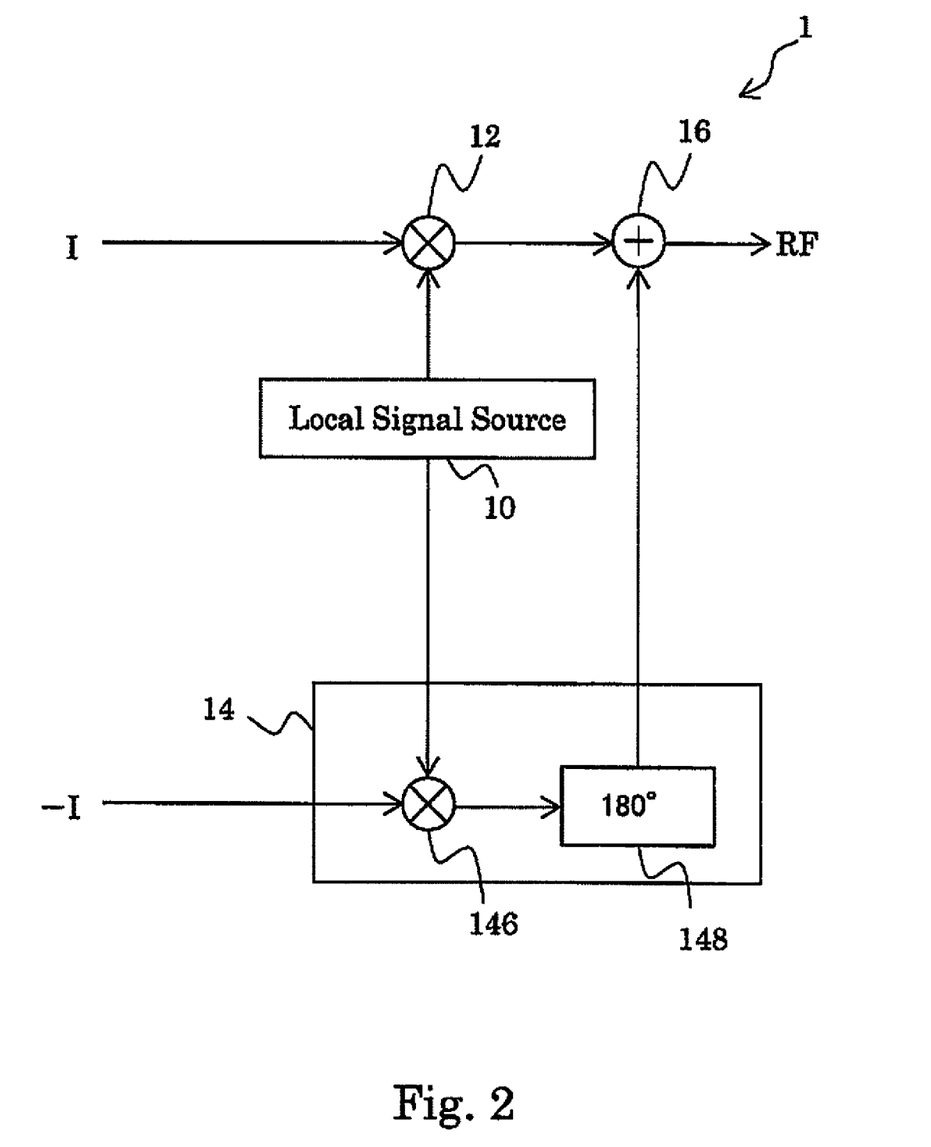
FIG. 2 is a diagram showing a configuration of a modulator 1 according to a second embodiment.

A second embodiment is different from the first embodiment in the configuration of the anti-phase leak component output unit 14.

FIG. 2 is a diagram showing a configuration of the modulator 1 according to the second embodiment. The modulator 1 includes the local signal source 10, the multiplier 12, the anti-phase leak component output unit 14 and the adder 16. In the following, the same components are denoted by the same numerals as of the first embodiment, and descriptions thereof will be omitted.

The local signal source 10, the multiplier 12 and the adder 16 are the same as those of the first embodiment, and hence descriptions thereof are omitted.

The anti-phase leak component output unit 14 outputs an anti-phase leak component equivalent to a signal obtained by inverting the phase of the leak component based on the in-phase local signal. The anti-phase leak component output unit 14 includes an anti-phase multiplier 146 and a phase inverter 148.

The anti-phase multiplier 146 receives the in-phase local signal from the local signal source 10. Moreover, the anti-phase multiplier 146 receives the anti-phase baseband signal −I. Then, the anti-phase multiplier 146 multiplies the in-phase local signal and the anti-phase baseband signal −I by each other.

The phase inverter 148 inverts the phase of an output from the anti-phase multiplier 146. The phase inverter 148 is a 180-degree phase shifter, a logic circuit or an amplifier (only an amplifier which inverts the phase is applicable), for example. The phase inverter 148 further feeds its output to the adder 16.

It should be noted that a leak characteristic of the anti-phase multiplier 146 is identical with the leak characteristic of the multiplier 12.

In other words, (1) the signal (leak component) which is the in-phase local signal leaked from the multiplier 12 when the in-phase baseband signal I and the in-phase local signal are fed to the multiplier 12, and (2) the signal which is the in-phase local signal leaked from the anti-phase multiplier 146 when the in-phase baseband signal I and the in-phase local signal are fed to the anti-phase multiplier 146 are the same.

The anti-phase multiplier 146 is realized by forming the multiplier 12 and the anti-phase multiplier 146 as matched-pair mixers which have a monolithic structure and are identical each other in the characteristic.

A description will now be given of an operation of the second embodiment.

The local signal source 10 outputs the in-phase local signal. The in-phase local signal is fed to the multiplier 12 and the anti-phase leak component output unit 14.

The multiplier 12 multiplies the in-phase baseband signal I and the in-phase local signal by each other, and outputs the result of the multiplication to the adder 16. On this occasion, the result of the multiplication carried out by the multiplier 12 and the leak component leaked from the multiplier 12 as well are output to the adder 16.

The in-phase local signal is fed to the anti-phase multiplier 146. The anti-phase multiplier 146 multiplies the anti-phase baseband signal −I and the in-phase local signal by each other. The result of the multiplication carried out by the anti-phase multiplier 146 is output to the phase inverter 148. On this occasion, the result of the multiplication carried out by the anti-phase multiplier 146 and the signal which is the in-phase local signal leaked from the anti-phase multiplier 146 as well are output to the phase inverter 148.

The phase inverter 148 receives the output from the anti-phase multiplier 146, inverts the phase thereof, and feeds the resulting signal to the adder 16.

The characteristic of the anti-phase multiplier 146 and the characteristic of the multiplier 12 are identical each other. The anti-phase baseband signal −I fed to the anti-phase multiplier 146 is opposite in polarity to the in-phase baseband signal I fed to the multiplier 12.

Thus, the result of the multiplication carried out by the anti-phase multiplier 146 is the same signal as an inversion in polarity of the result of the multiplication carried out by the multiplier 12.

On this occasion, the result of the multiplication carried out by the anti-phase multiplier 146 is inverted in phase by the phase inverter 148. Thus, the signal which is the result of the multiplication carried out by the anti-phase multiplier 146 fed to the adder 16 via the phase inverter 148 is the same signal as the result of the multiplication carried out by the multiplier 12.

The characteristic of the anti-phase multiplier 146 and the characteristic of the multiplier 12 are identical each other. Moreover, the in-phase local signal fed to the anti-phase multiplier 146 is the same as the in-phase local signal fed to the multiplier 12.

Thus, the leak component output from the multiplier 12 and the signal which is the in-phase local signal leaked from the anti-phase multiplier 146 are the same signals.

On this occasion, the signal which is the in-phase local signal leaked from the anti-phase multiplier 146 is inverted in phase by the phase inverter 148. Thus, the signal which is the in-phase local signal leaked from the anti-phase multiplier 146 and fed to the adder 16 via the phase inverter 148 is the same signal as an inversion in polarity of the leak component output from the multiplier 12.

The adder 16 adds the output from the multiplier 12 and the output from the anti-phase leak component output unit 14 (phase inverter 148) to each other.

The signal which is the result of the multiplication carried out by the anti-phase multiplier 146 fed to the adder 16 via the phase inverter 148 is the same signal as the result of the multiplication carried out by the multiplier 12. Therefore, the result of the multiplication carried out by the multiplier 12 is doubled and is output from the adder 16.

The addition by the adder 16 of the signal which is the in-phase local signal leaked from the anti-phase multiplier 146 and fed to the adder 16 via the phase inverter 148, and the leak component output from the multiplier 12 to each other results in zero. In other words, the leak component output from the multiplier 12 is cancelled.

According to the second embodiment, as the first embodiment, it is possible to cancel the second-order distortion (leak component) in the output from the multiplier 12.

Moreover, according to the second embodiment, as the first embodiment, the result of the multiplication carried out by the multiplier 12 is doubled and is output from the adder 16. Therefore, compared with a case in which the anti-phase leak component output unit 14 and the adder 16 are not used, the output of the multiplier 12 can be halved. As a result, the second-order distortion in the output from the multiplier 12 can be reduced.

Third Embodiment

Figure 3:
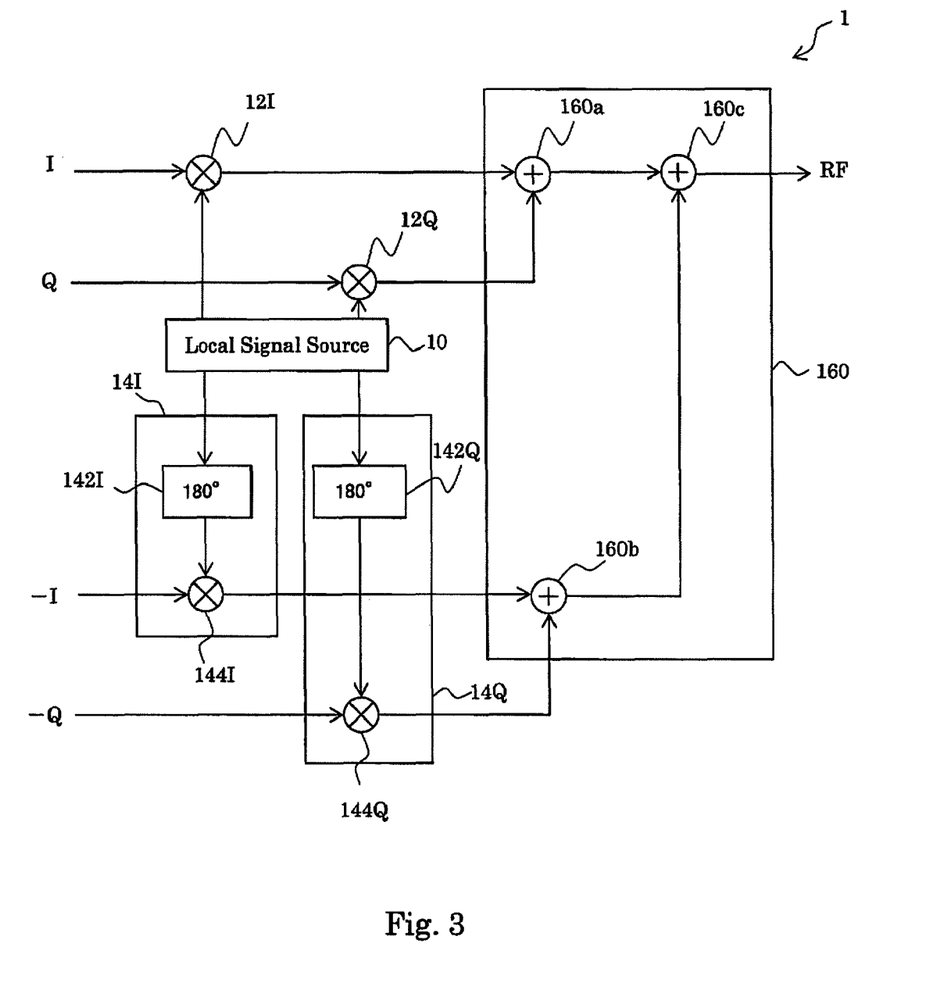
FIG. 3 is a diagram showing a configuration of a modulator 1 according to a third embodiment.

A third embodiment is an application of the first embodiment to a circuit for modulating an I signal and a Q signal.

FIG. 3 is a diagram showing a configuration of the modulator 1 according the third embodiment. The modulator 1 includes the local signal source 10, a multiplier for I signal 12I, a multiplier for Q signal 12Q, an anti-phase I leak component output unit 14I, an anti-phase Q leak component output unit 14Q and an adding unit 160. In the following, the same components are denoted by the same numerals as of the first embodiment, and descriptions thereof will be omitted.

The in-phase baseband signal includes an in-phase baseband I signal I and an in-phase baseband Q signal Q. The anti-phase baseband signal includes an anti-phase baseband I signal −I and an anti-phase baseband Q signal −Q.

The local signal source 10 is the same as that of the first embodiment, and hence a description thereof is omitted.

The multiplier for I signal 12I receives the in-phase local signal from the local signal source 10. Then, the multiplier for I signal 12I receives the in-phase baseband I signal I. Moreover, the multiplier for I signal 12I multiplies the in-phase baseband I signal I and the in-phase local signal by each other. It should be noted that the in-phase local signal leaked from the multiplier for I signal 12I is referred to as I leak component.

The multiplier for Q signal 12Q receives the in-phase local signal from the local signal source 10. Then, the multiplier for Q signal 12Q receives the in-phase baseband Q signal Q. Moreover, the multiplier for Q signal 12Q multiplies the in-phase baseband Q signal Q and the in-phase local signal by each other. It should be noted that the in-phase local signal leaked from the multiplier for Q signal 12Q is referred to as Q leak component.

The anti-phase I leak component output unit 14I outputs an anti-phase I leak component equivalent to a signal obtained by inverting the phase of the I leak component.

The anti-phase I leak component output unit 14I includes a phase inverter for I signal 142I and an anti-phase multiplier for I signal 144I.

The phase inverter for I signal 142I receives the in-phase local signal from the local signal source 10. Then, the phase inverter for I signal 142I outputs a signal obtained by inverting the phase of the in-phase local signal (referred to as "anti-phase local signal"). The phase inverter for I signal 142I is a 180-degree phase shifter, a logic circuit or an amplifier (only an amplifier which inverts the phase is applicable), for example.

The anti-phase multiplier for I signal 144I multiplies the anti-phase baseband signal −I and the output (anti-phase local signal) from the phase inverter for I signal 142I by each other. It should be noted that the anti-phase baseband signal −I is equivalent to a signal obtained by inverting the phase of the in-phase baseband signal I.

It should be noted that a leak characteristic of the anti-phase multiplier for I signal 144I is identical with a leak characteristic of the multiplier for I signal 12I.

In other words, (1) the signal (I leak component) which is the in-phase local signal leaked from the multiplier for I signal 12I when the in-phase baseband signal I and the in-phase local signal are fed to the multiplier for I signal 12I, and (2) the signal which is the in-phase local signal leaked from the anti-phase multiplier for I signal 144I when the in-phase baseband signal I and the in-phase local signal are fed to the anti-phase multiplier for I signal 144I are the same.

The anti-phase multiplier for I signal 144I is realized by forming the multiplier for I signal 12I and the anti-phase multiplier for I signal 144I as matched-pair mixers which have a monolithic structure and are identical each other in the characteristic.

The anti-phase Q leak component output unit 14Q outputs an anti-phase Q leak component equivalent to a signal obtained by inverting the phase of the Q leak component.

The anti-phase Q leak component output unit 14Q includes a phase inverter for Q signal 142Q and an anti-phase multiplier for Q signal 144Q.

The phase inverter for Q signal 142Q receives the in-phase local signal from the local signal source 10. Then, the phase inverter for Q signal 142Q outputs a signal obtained by inverting the phase of the in-phase local signal (referred to as "anti-phase local signal"). The phase inverter for Q signal 142Q is a 180-degree phase shifter, a logic circuit or an amplifier (only an amplifier which inverts the phase is applicable), for example.

The anti-phase multiplier for Q signal 144Q multiplies the anti-phase baseband signal −Q and the output (anti-phase local signal) from the phase inverter for Q signal 142Q by each other. It should be noted that the anti-phase baseband signal −Q is equivalent to a signal obtained by inverting the phase of the in-phase baseband signal Q.

It should be noted that a leak characteristic of the anti-phase multiplier for Q signal 144Q is identical with a leak characteristic of the multiplier for Q signal 12Q.

In other words, (1) the signal (Q leak component) which is the in-phase local signal leaked from the multiplier for Q signal 12Q when the in-phase baseband signal Q and the in-phase local signal are fed to the multiplier for Q signal 12Q, and (2) the signal which is the in-phase local signal leaked from the anti-phase multiplier for Q signal 144Q when the in-phase baseband signal Q and the in-phase local signal are fed to the anti-phase multiplier for Q signal 144Q are the same.

The anti-phase multiplier for Q signal 144Q is realized by forming the multiplier for Q signal 12Q and the anti-phase multiplier for Q signal 144Q as matched-pair mixers which have a monolithic structure and are identical each other in the characteristic.

The adding unit 160 adds an output from the multiplier for I signal 12I, an output from the anti-phase I leak component output unit 14I, an output from the multiplier for Q signal 12Q and an output from the anti-phase Q leak component output unit 14Q together. As a result, it is considered that the adding unit 160 adds the output from the multiplier for I signal 12I and the output from the anti-phase I leak component output unit 14I to each other. Moreover, it is considered that the adding unit 160 adds the output from the multiplier for Q signal 12Q and the output from the anti-phase Q leak component output unit 14Q to each other.

The adding unit 160 includes adders 160*a*, 160*b* and 160*c*.

The adder 160*a* adds the output from the multiplier for I signal 12I and the output from the multiplier for Q signal 12Q to each other. The adder 160*b* adds the output from the anti-phase I leak component output unit 14I (anti-phase multiplier for I signal 144I) and the output from the anti-phase Q leak component output unit 14Q (anti-phase multiplier for Q signal 144Q) to each other. The adder 160*c* adds an output from the adder 160*a* and an output from the adder 160*b* to each other.

A description will now be given of an operation of the third embodiment.

The local signal source 10 outputs the in-phase local signal. The in-phase local signal is fed to the multiplier for I signal 12I, the anti-phase I leak component output unit 14I, the multiplier for Q signal 12Q and the anti-phase Q leak component output unit 14Q.

The multiplier for I signal 12I multiplies the in-phase baseband I signal I and the in-phase local signal by each other, and outputs the result of the multiplication to the adder 160*a*. On this occasion, the result of the multiplication carried out by the multiplier for I signal 12I and the I leak component leaked from the multiplier for I signal 12I as well are output to the adder 160*a*.

The in-phase local signal is inverted in phase by the phase inverter for I signal 142I, and is fed to the anti-phase multiplier for I signal 144I. The anti-phase multiplier for I signal 144I multiplies the anti-phase baseband signal −I and the output (anti-phase local signal) from the phase inverter for I signal 142I by each other. The result of the multiplication carried out by the anti-phase multiplier for I signal 144I is output to the adder 160b. On this occasion, the result of the multiplication carried out by the anti-phase multiplier for I signal 144I and the signal which is the output from the phase inverter for I signal 142I leaked from the anti-phase multiplier for I signal 144I as well are output to the adder 160b.

The characteristic of the anti-phase multiplier for I signal 144I and the characteristic of the multiplier for I signal 12I are identical each other. The anti-phase baseband signal −I fed to the anti-phase multiplier for I signal 144I is opposite in polarity to the in-phase baseband signal I fed to the multiplier for I signal 12I. Moreover, the anti-phase local signal fed to the anti-phase multiplier for I signal 144I is opposite in polarity to the in-phase local signal fed to the multiplier for I signal 12I.

Thus, the result of the multiplication carried out by the anti-phase multiplier for I signal 144I is the same signal as the result of the multiplication carried out by the multiplier for I signal 12I.

The characteristic of the anti-phase multiplier for I signal 144I and the characteristic of the multiplier for I signal 12I are identical each other. Moreover, the anti-phase local signal fed to the anti-phase multiplier for I signal 144I is opposite in polarity to the in-phase local signal fed to the multiplier for I signal 12I.

Thus, an inversion in polarity of the I leak component output from the multiplier for I signal 12I, and the signal which is the output from the phase inverter for I signal 142I leaked from the anti-phase multiplier for I signal 144I are the same.

The adder 160c adds the result of the multiplication carried out by the multiplier for I signal 12I (and the result of the multiplication carried out by the multiplier for Q signal 12Q) and the output from the anti-phase multiplier for I signal 144I (and the output from the anti-phase multiplier for Q signal 144Q) to each other.

Since the result of the multiplication carried out by the anti-phase multiplier for I signal 144I is the same signal as the result of the multiplication carried out by the multiplier for I signal 12I, the result of the multiplication carried out by the multiplier for I signal 12I is doubled and is output from the adder 160c.

The addition by the adder 160c of the I leak component output from the multiplier for I signal 12I and the signal which is the output from the phase inverter for I signal 142I leaked from the anti-phase multiplier for I signal 144I to each other results in zero. In other words, the I leak component output from the multiplier for I signal 12I is cancelled.

The multiplier for Q signal 12Q multiplies the in-phase baseband Q signal Q and the in-phase local signal by each other, and outputs the result of the multiplication to the adder 160a. On this occasion, the result of the multiplication carried out by the multiplier for Q signal 12Q and the Q leak component leaked from the multiplier for Q signal 12Q as well are output to the adder 160a.

The in-phase local signal is inverted in phase by the phase inverter for Q signal 142Q, and is fed to the anti-phase multiplier for Q signal 144Q. The anti-phase multiplier for Q signal 144Q multiplies the anti-phase baseband signal −Q and the output (anti-phase local signal) from the phase inverter for Q signal 142Q by each other. The result of the multiplication carried out by the anti-phase multiplier for Q signal 144Q is output to the adder 160b. On this occasion, the result of the multiplication carried out by the anti phase multiplier for Q signal 144Q and the signal which is the output from the phase inverter for Q signal 142Q leaked from the anti-phase multiplier for Q signal 144Q as well are output to the adder 160b.

The characteristic of the anti-phase multiplier for Q signal 144Q and the characteristic of the multiplier for Q signal 12Q are identical each other. The anti-phase baseband signal −Q fed to the anti-phase multiplier for Q signal 144Q is opposite in polarity to the in-phase baseband signal Q fed to the multiplier for Q signal 12Q. Moreover, the anti-phase local signal fed to the anti-phase multiplier for Q signal 144Q is opposite in polarity to the in-phase local signal fed to the multiplier for Q signal 12Q.

Thus, the result of the multiplication carried out by the anti-phase multiplier for Q signal 144Q is the same signal as the result of the multiplication carried out by the multiplier for Q signal 12Q.

The characteristic of the anti-phase multiplier for Q signal 144Q and the characteristic of the multiplier for Q signal 12Q are identical each other. Moreover, the anti-phase local signal fed to the anti-phase multiplier for Q signal 144Q is opposite in polarity to the in-phase local signal fed to the multiplier for Q signal 12Q.

Thus, an inversion in polarity of the Q leak component output from the multiplier for Q signal 12Q, and the signal which is the output from the phase inverter for Q signal 142Q leaked from the anti-phase multiplier for Q signal 144Q are the same.

The adder 160c adds the result of the multiplication carried out by the multiplier for Q signal 12Q (and the result of the multiplication carried out by the multiplier for I signal 12I) and the output from the anti-phase multiplier for Q signal 144Q (and the output from the anti-phase multiplier for I signal 144I) to each other.

Since the result of the multiplication carried out by the anti-phase multiplier for Q signal 144Q is the same signal as the result of the multiplication carried out by the multiplier for Q signal 12Q, the result of the multiplication carried out by the multiplier for Q signal 12Q is doubled and is output from the adder 160c.

The addition by the adder 160c of the Q leak component output from the multiplier for Q signal 12Q and the signal which is the output from the phase inverter for Q signal 142Q leaked from the anti-phase multiplier for Q signal 144Q to each other results in zero. In other words, the Q leak component output from the multiplier for Q signal 12Q is cancelled.

According to the third embodiment, when the I signal and the Q signal are modulated by the quadrature modulation, it is possible, as the first embodiment, to cancel the second-order distortion (I leak component) in the output from the multiplier for I signal 12I and the second-order distortion (Q leak component) in the output from the multiplier for Q signal 12Q.

Moreover, according to the third embodiment, as the first embodiment, the result of the multiplication carried out by the multiplier for I signal 12I (multiplier for Q signal 12Q) is doubled and is output from the adder 160c. Therefore, compared with a case in which the anti-phase I leak component output unit 14I, the anti-phase Q leak component output unit 14Q and the adding unit 160 are not used, the output of the multiplier for I signal 12I (multiplier for Q signal 12Q) can be halved. As a result, the second-order distortion in the output from the multiplier for I signal 12I (multiplier for Q signal 12Q) can be reduced.

Fourth Embodiment

Figure 4:
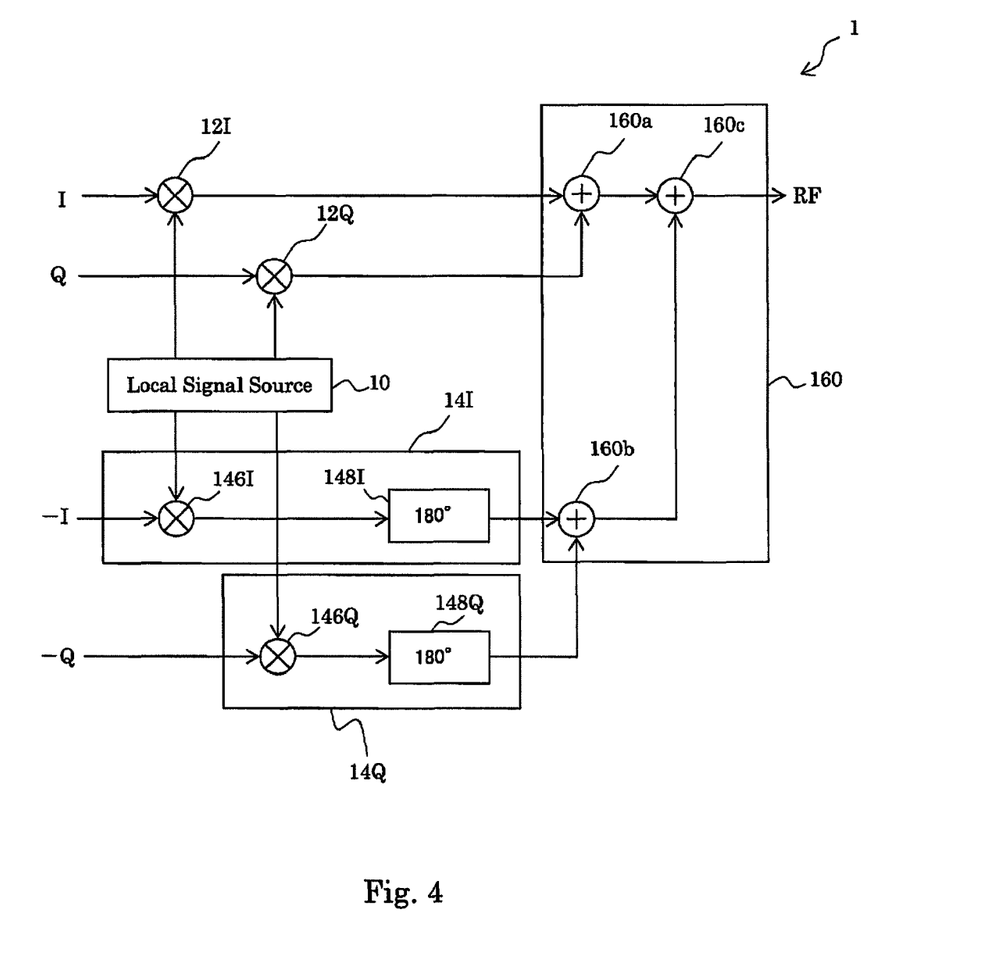
FIG. 4 is a diagram showing a configuration of a modulator 1 according to a fourth embodiment.

A fourth embodiment is application of the second embodiment to a circuit for modulating the I signal and the Q signal. The fourth embodiment can be considered as a circuit in which the configurations of the anti-phase I leak component output unit 14I and the anti-phase Q leak component output unit 14Q according to the third embodiment are changed as in the second embodiment.

FIG. 4 is a diagram showing a configuration of the modulator 1 according the fourth embodiment. The modulator 1 includes the local signal source 10, the multiplier for I signal 12I, the multiplier for Q signal 12Q, the anti-phase I leak component output unit 14I, the anti-phase Q leak component output unit 14Q and the adding unit 160. In the following, the same components are denoted by the same numerals as of the third embodiment, and descriptions thereof will be omitted.

The local signal source 10, the multiplier for I signal 12I, the multiplier for Q signal 12Q and the adding unit 160 are the same as those of the third embodiment, and hence descriptions thereof are omitted.

The anti-phase I leak component output unit 14I outputs an anti-phase leak component equivalent to a signal obtained by inverting the phase of the leak component based on the in-phase local signal. The anti-phase I leak component output unit 14I includes an anti-phase multiplier for I signal 146I and a phase inverter for I signal 148I.

The anti-phase multiplier for I signal 146I receives the in-phase local signal from the local signal source 10. Moreover, the anti-phase multiplier for I signal 146I receives the anti-phase baseband signal −I. Then, the anti-phase multiplier for I signal 146I multiplies the in-phase local signal and the anti-phase baseband signal −I by each other.

The phase inverter for I signal 148I inverts the phase of an output from the anti-phase multiplier for I signal 146I. The phase inverter for I signal 148I is a 180-degree phase shifter, a logic circuit or an amplifier (only an amplifier which inverts the phase is applicable), for example. The phase inverter for I signal 148I further feeds its output to the adder 160b.

It should be noted that a leak characteristic of the anti-phase multiplier for I signal 146I is identical with the leak characteristic of the multiplier for I signal 12I.

In other words,
(1) the signal (I leak component) which is the in-phase local signal leaked from the multiplier for I signal 12I when the in-phase baseband signal I and the in-phase local signal are fed to the multiplier for I signal 12I, and
(2) the signal which is the in-phase local signal leaked from the anti-phase multiplier for I signal 146I when the in-phase baseband signal I and the in-phase local signal are fed to the anti-phase multiplier for I signal 146I
are the same.

The anti-phase multiplier for I signal 146I is realized by forming the multiplier for I signal 12I and the anti-phase multiplier for I signal 146I as matched-pair mixers which have a monolithic structure and are identical each other in the characteristic.

The anti-phase Q leak component output unit 14Q outputs an anti-phase leak component equivalent to a signal obtained by inverting the phase of the leak component based on the in-phase local signal. The anti-phase Q leak component output unit 14Q includes an anti-phase multiplier for Q signal 146Q and a phase inverter for Q signal 148Q.

The anti-phase multiplier for Q signal 146Q receives the in-phase local signal from the local signal source 10. Moreover, the anti-phase multiplier for Q signal 146Q receives the anti-phase baseband signal −Q. Then, the anti-phase multiplier for Q signal 146Q multiplies the in-phase local signal and the anti-phase baseband signal −Q by each other.

The phase inverter for Q signal 148Q inverts the phase of an output from the anti-phase multiplier for Q signal 146Q. The phase inverter for Q signal 148Q is a 180-degree phase shifter, a logic circuit or an amplifier (only an amplifier which inverts the phase is applicable), for example. The phase inverter for Q signal 148Q further feeds its output to the adder 160b.

It should be noted that a leak characteristic of the anti-phase multiplier for Q signal 146Q is identical with the leak characteristic of the multiplier for Q signal 12Q.

In other words,
(1) the signal (Q leak component) which is the in-phase local signal leaked from the multiplier for Q signal 12Q when the in-phase baseband signal Q and the in-phase local signal are fed to the multiplier for Q signal 12Q, and
(2) the signal which is the in-phase local signal leaked from the anti-phase multiplier for Q signal 146Q when the in-phase baseband signal Q and the in-phase local signal are fed to the anti-phase multiplier for Q signal 146Q
are the same.

The anti-phase multiplier for Q signal 146Q is realized by forming the multiplier for Q signal 12Q and the anti-phase multiplier for Q signal 146Q as matched-pair mixers which have a monolithic structure and are identical each other in the characteristic.

A description will now be given of an operation of the fourth embodiment.

The local signal source 10 outputs the in-phase local signal. The in-phase local signal is fed to the multiplier for I signal 12I, the anti-phase I leak component output unit 14I, the multiplier for Q signal 12Q and the anti-phase Q leak component output unit 14Q.

The multiplier for I signal 12I multiplies the in-phase baseband signal I and the in-phase local signal by each other, and outputs the result of the multiplication to the adder 160a. On this occasion, the result of the multiplication carried out by the multiplier for I signal 12I and the I leak component leaked from the multiplier for I signal 12I as well are output to the adder 160a.

The in-phase local signal is fed to the anti-phase multiplier for I signal 146I. The anti-phase multiplier for I signal 146I multiplies the anti-phase baseband signal −I and the in-phase local signal by each other. The result of the multiplication carried out by the anti-phase multiplier for I signal 146I is output to the phase inverter for I signal 148I. On this occasion, the result of the multiplication carried out by the anti-phase multiplier for I signal 146I and the signal which is the in-phase local signal leaked from the anti-phase multiplier for I signal 146I as well are output to the phase inverter for I signal 148I.

The phase inverter for I signal 148I receives the output from the anti-phase multiplier for I signal 146I, inverts the phase thereof, and feeds the resulting signal to the adder 160b.

The characteristic of the anti-phase multiplier for I signal 146I and the characteristic of the multiplier for I signal 12I are identical each other. The anti-phase baseband signal −I fed to the anti-phase multiplier for I signal 146I is opposite in polarity to the in-phase baseband signal I fed to the multiplier for I signal 12I.

Thus, the result of the multiplication carried out by the anti-phase multiplier for I signal 146I is the same signal as an inversion in polarity of the result of the multiplication carried out by the multiplier for I signal 12I.

On this occasion, the result of the multiplication carried out by the anti-phase multiplier for I signal 146I is inverted in phase by the phase inverter for I signal 148I. Thus, the signal which is the result of the multiplication carried out by the anti-phase multiplier for I signal 146I and fed to the adder 160b via the phase inverter for I signal 148I is the same signal as the result of the multiplication carried out by the multiplier for I signal 12I.

The characteristic of the anti-phase multiplier for I signal 146I and the characteristic of the multiplier for I signal 12I are identical each other. Moreover, the in-phase local signal fed to the anti-phase multiplier for I signal 146I is the same as the in-phase local signal fed to the multiplier for I signal 12I.

Thus, the leak component output from the multiplier for I signal 12I and the signal which is the in-phase local signal leaked from the anti-phase multiplier for I signal 146I are the same signals.

On this occasion, the signal which is the in-phase local signal leaked from the anti-phase multiplier for I signal 146I is inverted in phase by the phase inverter for I signal 148I. Thus, the signal which is the in-phase local signal leaked from the anti-phase multiplier for I signal 146I and fed to the adder 160b via the phase inverter for I signal 148I is the same signal as an inversion in polarity of the I leak component output from the multiplier for I signal 12I.

The adder 160c adds the result of the multiplication carried out by the multiplier for I signal 12I (and the result of the multiplication carried out by the multiplier for Q signal 12Q) and the output from the phase inverter for I signal 148I (and the output from the phase inverter for Q signal 148Q) to each other.

The signal which is the result of the multiplication carried out by the anti-phase multiplier for I signal 146I and fed to the adder 160b via the phase inverter for I signal 148I is the same signal as the result of the multiplication carried out by the multiplier for I signal 12I. Therefore, the result of the multiplication carried out by the multiplier for I signal 12I is doubled and is output from the adder 160c.

The addition by the adder 160c of the signal which is the in-phase local signal leaked from the anti-phase multiplier for I signal 146I and fed to the adder 160b via the phase inverter for I signal 148I, and the I leak component output from the multiplier for I signal 12I to each other results in zero. In other words, the I leak component output from the multiplier for I signal 12I is cancelled.

The multiplier for Q signal 12Q multiplies the in-phase baseband signal Q and the in-phase local signal by each other, and outputs the result of the multiplication to the adder 160a. On this occasion, the result of the multiplication carried out by the multiplier for Q signal 12Q and the Q leak component leaked from the multiplier for Q signal 12Q as well are output to the adder 160a.

The in-phase local signal is fed to the anti-phase multiplier for Q signal 146Q. The anti-phase multiplier for Q signal 146Q multiplies the anti-phase baseband signal –Q and the in-phase local signal by each other. The result of the multiplication carried out by the anti-phase multiplier for Q signal 146Q is output to the phase inverter for Q signal 148Q. On this occasion, the result of the multiplication carried out by the anti-phase multiplier for Q signal 146Q and the signal which is the in-phase local signal leaked from the anti-phase multiplier for Q signal 146Q as well are output to the phase inverter for Q signal 148Q.

The phase inverter for Q signal 148Q receives the output from the anti-phase multiplier for Q signal 146Q, inverts the phase thereof, and feeds the resulting signal to the adder 160b.

The characteristic of the anti-phase multiplier for Q signal 146Q and the characteristic of the multiplier for Q signal 12Q are identical each other. The anti-phase baseband signal –Q fed to the anti-phase multiplier for Q signal 146Q is opposite in polarity to the in-phase baseband signal Q fed to the multiplier for Q signal 12Q.

Thus, the result of the multiplication carried out by the anti-phase multiplier for Q signal 146Q is the same signal as an inversion in polarity of the result of the multiplication carried out by the multiplier for Q signal 12Q.

On this occasion, the result of the multiplication carried out by the anti-phase multiplier for Q signal 146Q is inverted in phase by the phase inverter for Q signal 148Q. Thus, the signal which is the result of the multiplication carried out by the anti-phase multiplier for Q signal 146Q and fed to the adder 160b via the phase inverter for Q signal 148Q is the same signal as the result of the multiplication carried out by the multiplier for Q signal 12Q.

The characteristic of the anti-phase multiplier for Q signal 146Q and the characteristic of the multiplier for Q signal 12Q are identical each other. Moreover, the in-phase local signal fed to the anti-phase multiplier for Q signal 146Q is the same as the in-phase local signal fed to the multiplier for Q signal 12Q.

Thus, the leak component output from the multiplier for Q signal 12Q and the signal which is the in-phase local signal leaked from the anti-phase multiplier for Q signal 146Q are the same signals.

On this occasion, the signal which is the in-phase local signal leaked from the anti-phase multiplier for Q signal 146Q is inverted in phase by the phase inverter for Q signal 148Q. Thus, the signal which is the in-phase local signal leaked from the anti-phase multiplier for Q signal 146Q, and is fed to the adder 160b via the phase inverter for Q signal 148Q is the same signal as an inversion in polarity of the Q leak component output from the multiplier for Q signal 12Q.

The adder 160c adds the result of the multiplication carried out by the multiplier for Q signal 12Q (and the result of the multiplication carried out by the multiplier for Q signal 12Q) and the output from the phase inverter for Q signal 148Q (and the output from the phase inverter for Q signal 148Q) to each other.

The signal which is the result of the multiplication carried out by the anti-phase multiplier for Q signal 146Q and fed to the adder 160b via the phase inverter for Q signal 148Q is the same signal as the result of the multiplication carried out by the multiplier for Q signal 12Q. Therefore, the result of the multiplication carried out by the multiplier for Q signal 12Q is doubled and is output from the adder 160c.

The addition by the adder 160c of the signal which is the in-phase local signal leaked from the anti-phase multiplier for Q signal 146Q and fed to the adder 160b via the phase inverter for Q signal 148Q, and the Q leak component output from the multiplier for Q signal 12Q to each other results in zero. In other words, the Q leak component output from the multiplier for Q signal 12Q is cancelled.

According to the fourth embodiment, when the I signal and the Q signal are modulated by the quadrature modulation, it is possible, as the second embodiment, to cancel the second-order distortion (I leak component) in the output from the multiplier for I signal 12I and the second-order distortion (Q leak component) in the output from the multiplier for Q signal 12Q.

Moreover, according to the fourth embodiment, as the second embodiment, the result of the multiplication carried out by the multiplier for I signal 12I (multiplier for Q signal 12Q) is doubled and is output from the adder 160c. Therefore, compared with a case in which the anti-phase I leak component output unit 14I, the anti-phase Q leak component output unit 14Q and the adding unit 160 are not used, the output of the multiplier for I signal 12I (multiplier for Q signal 12Q) can be halved. As a result, the second-order distortion in the output from the multiplier for I signal 12I (multiplier for Q signal 12Q) can be reduced.

Fifth Embodiment

Figure 5:
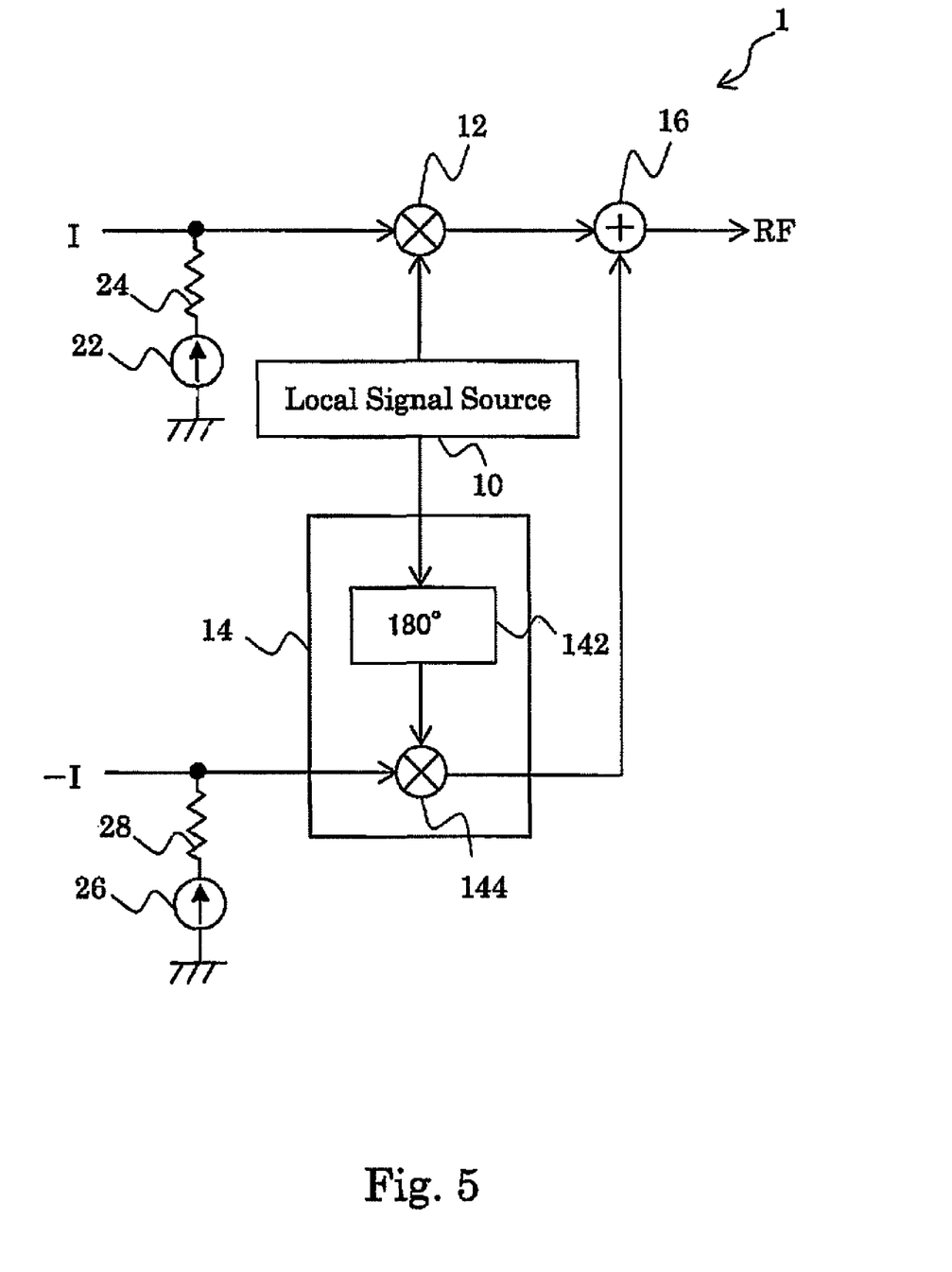
FIG. 5 is a diagram showing a configuration of a modulator 1 according to a fifth embodiment.

A fifth embodiment is a circuit in which, for restraining a third-order distortion, a first constant current source 22 and a second constant current source 26 are further provided for the modulator 1 according to the first embodiment.

FIG. 5 is a diagram showing a configuration of the modulator 1 according to the fifth embodiment. The modulator 1 includes the local signal source 10, the multiplier 12, the anti-phase leak component output unit 14, the adder 16, the first constant current source 22, a first resistor 24, the second constant current source 26 and a second resistor 28. In the following, the same components are denoted by the same numerals as of the first embodiment, and descriptions thereof will be omitted.

The local signal source 10, the multiplier 12, the anti-phase leak component output unit 14 and the adder 16 are the same as those of the first embodiment, and hence descriptions thereof are omitted.

The first constant current source 22 and the first resistor 24 constitute first current adding means which adds a predetermined current (magnitude i0) to the in-phase baseband signal I.

The first constant current source 22 is a constant current source which generates a predetermined current (magnitude i0). The first constant current source 22 is grounded at one end, and is connected to the first resistor 24 at the other end.

The first resistor 24 is connected at the one end to the first constant current source 22, and is connected at the other end to a wire which leads the in-phase baseband signal I to the multiplier 12.

The second constant current source 26 and the second resistor 28 constitute second current adding means which adds a current (magnitude i0) equivalent in magnitude to a predetermined current to a predetermined signal.

The second constant current source 26 is a constant current source which generates a current of the magnitude i0. The second constant current source 26 is grounded at one end, and is connected to the second resistor 28 at the other end.

The second resistor 28 is connected at the one end to the second constant current source 26, and is connected at the other end to a wire which leads the anti-phase baseband signal −I to the anti-phase multiplier 144.

A description will now be given of an operation of the fifth embodiment.

When the current of the in-phase baseband signal I is denoted by if, the current of the anti-phase baseband signal −I is denoted by −if. Moreover, it is assumed that i0>if.

The current having the magnitude of if+i0=i1 is fed to the multiplier 12. A result of the multiplication rf1 output from the multiplier 12 is represented as follows:

$$rf1 = (kT/q)\ln((I+Is)/(I+Is+i1)) \qquad (1)$$

where k denotes the Boltzmann constant; T denotes temperature constant; q denotes charge; I denotes the magnitude of the current of the in-phase local signal; and Is denotes saturation current of the multiplier 12.

The current having the magnitude of −if+i0=i2 is fed to the anti-phase multiplier 144. A result of the multiplication rf2 output from the anti-phase multiplier 144 is represented as follows:

$$rf2 = -(kT/q)\ln((I+Is)/(I+Is+i2)) \qquad (2)$$

On this occasion, a current output from the adder 16 is rf1+rf2, and, based on the equations (1) and (2), the current is represented as follows:

$$rf1+rf2 = (kT/q)\ln((I+Is+i2)/(I+Is+i1)) \qquad (3)$$

If i1=i2, it is considered that a third-order distortion component caused by the multiplier 12 is cancelled. Therefore, when i0 is excessively larger than if, it can be considered that i1=i2, and the third-order distortion component caused by the multiplier 12 is cancelled.

Actually, by assigning i0 to the equation (3) while changing the value thereof, there occurs a case in which rf1+rf2=0. It is possible to cancel the third-order distortion component caused by the multiplier 12 by employing such i0.

It should be noted that the leak component output from the multiplier 12 is cancelled as in the first embodiment, and descriptions thereof are omitted.

According to the fifth embodiment, the leak component output from the multiplier 12 is cancelled as in the first embodiment. Moreover, it is possible to restrain the third-order distortion component caused by the multiplier 12.

Sixth Embodiment

Figure 6:
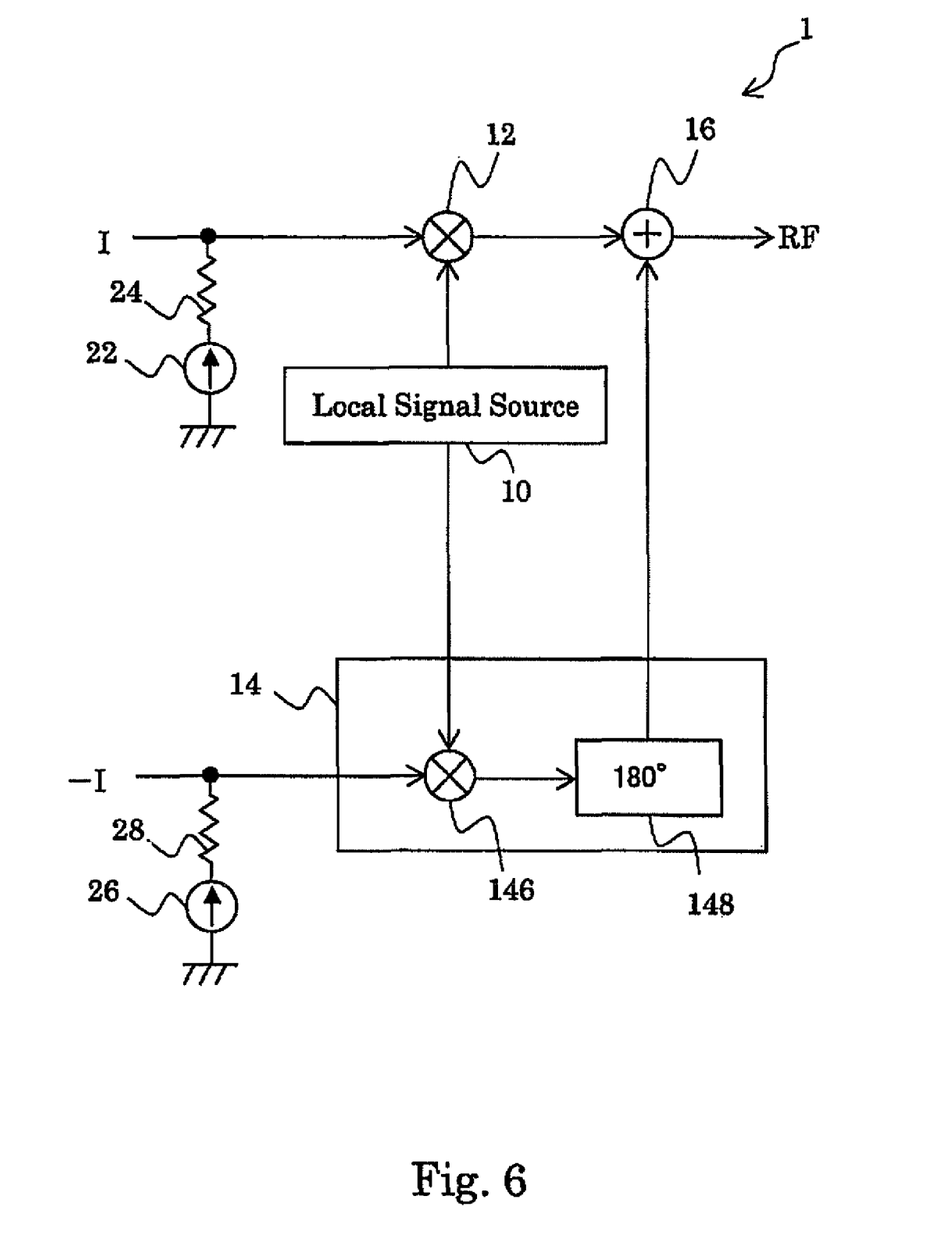
FIG. 6 is a diagram showing a configuration of a modulator 1 according to a sixth embodiment.

A sixth embodiment is a circuit in which, for restraining the third-order distortion, the first constant current source 22 and the second constant current source 26 are further provided for the modulator 1 according to the second embodiment.

FIG. 6 is a diagram showing a configuration of the modulator 1 according to the sixth embodiment. The modulator 1 includes the local signal source 10, the multiplier 12, the anti-phase leak component output unit 14, the adder 16, the first constant current source 22, the first resistor 24, the second constant current source 26 and the second resistor 28. In the following, the same components are denoted by the same numerals as of the second embodiment, and descriptions thereof will be omitted.

The local signal source 10, the multiplier 12, the anti-phase leak component output unit 14 and the adder 16 are the same as those of the second embodiment, and hence descriptions thereof are omitted.

The first constant current source 22, the first resistor 24, the second constant current source 26 and the second resistor 28 are the same as those of the fifth embodiment, and hence descriptions thereof are omitted.

An operation of the sixth embodiment, in terms of a point that the leak component output from the multiplier 12 is cancelled, is the same as the second embodiment, and hence a description thereof is omitted.

Moreover, the operation of the sixth embodiment, in terms of a point that the third-order distortion component caused by the multiplier 12 is cancelled, is the same as the fifth embodiment, and hence a description thereof is omitted.

According to the sixth embodiment, the leak component output from the multiplier 12 is cancelled as in the second embodiment. Moreover, it is possible to restrain the third-order distortion component caused by the multiplier 12.

Seventh Embodiment

Figure 7:
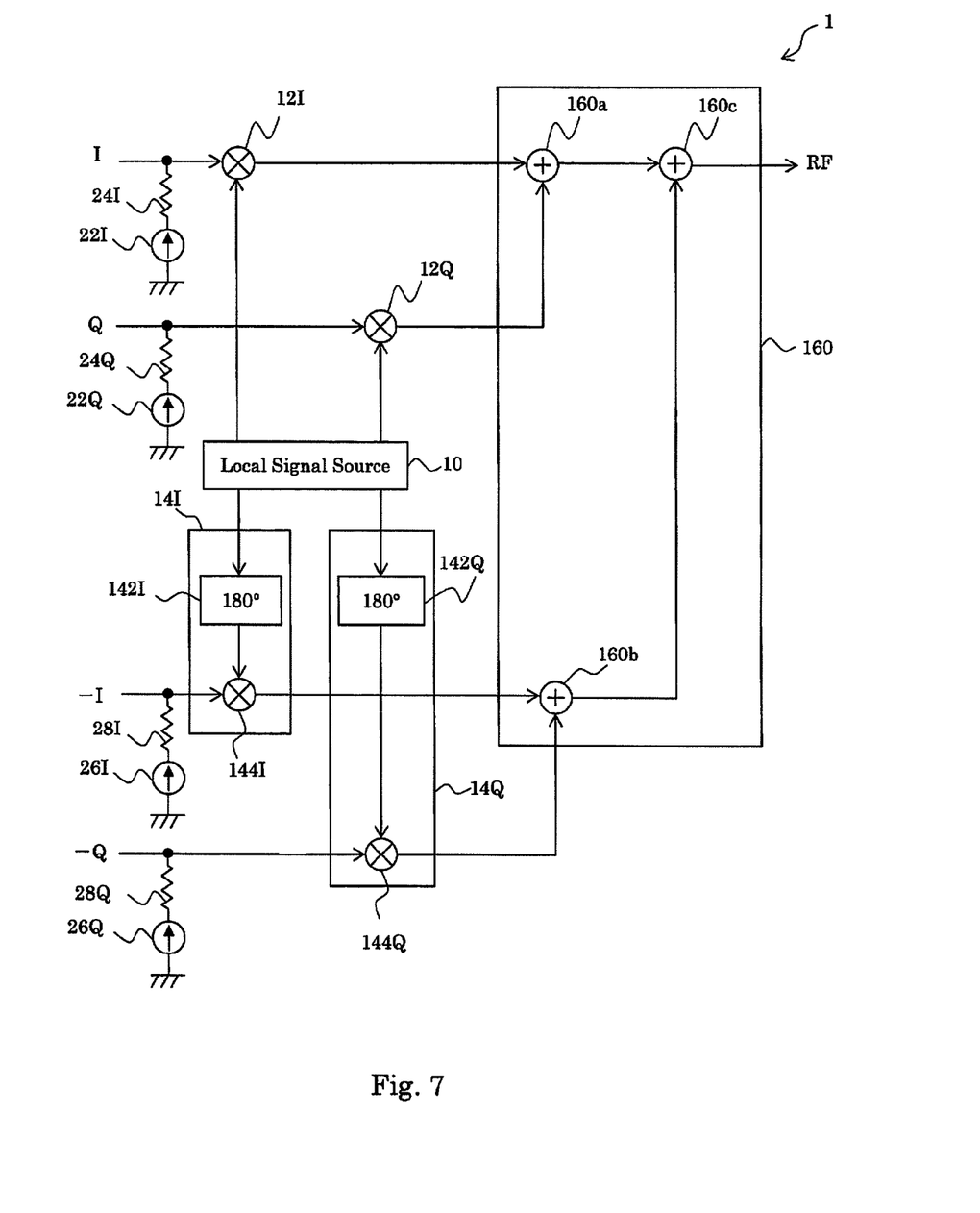
FIG. 7 is a diagram showing a configuration of a modulator 1 according to a seventh embodiment.

A seventh embodiment is a circuit in which, for restraining the third-order distortion, a first constant current source for I signal 22I, a second constant current source for I signal 26I, a first constant current source for Q signal 22Q and a second constant current source for Q signal 26Q are further provided for the modulator 1 according to the third embodiment.

FIG. 7 is a diagram showing a configuration of the modulator 1 according to the seventh embodiment. The modulator 1 includes the local signal source 10, the multiplier for I signal 12I, the multiplier for Q signal 12Q, the anti-phase I leak component output unit 14I, the anti-phase Q leak component output unit 14Q, the adding unit 160, the first constant current source for I signal 22I, a first resistor for I signal 24I, the second constant current source for I signal 26I, a second resistor for I signal 28I, the first constant current source for Q signal 22Q, a first resistor for Q signal 24Q, the second constant current source for Q signal 26Q and a second resistor for Q signal 28Q. In the following, the same components are denoted by the same numerals as of the third embodiment, and descriptions thereof will be omitted.

The local signal source 10, the multiplier for I signal 12I, the multiplier for Q signal 12Q, the anti-phase I leak component output unit 14I, the anti-phase Q leak component output unit 14Q and the adding unit 160 are the same as those of the third embodiment, and hence descriptions thereof are omitted.

The first constant current source for I signal 22I, the first resistor for I signal 24I, the second constant current source for I signal 26I and the second resistor for I signal 28I are the same as the first constant current source 22, the first resistor 24, the second constant current source 26 and the second resistor 28 according to the fifth embodiment, and hence descriptions thereof are omitted.

The first constant current source for Q signal 22Q, the first resistor for Q signal 24Q, the second constant current source for Q signal 26Q and the second resistor for Q signal 28Q are the same as the first constant current source 22, the first resistor 24, the second constant current source 26 and the second resistor 28 according to the fifth embodiment, and hence descriptions thereof are omitted.

It should be noted that the magnitudes of the currents output from the first constant current source for I signal 22I and the second constant current source for I signal 26I need to be the same. Moreover, the magnitudes of the currents output from the first constant current source for Q signal 22Q and the second constant current source for Q signal 26Q need to be the same. However, the magnitudes of the currents output from the first constant current source for I signal 22I and the first constant current source for Q signal 22Q are not necessarily the same.

An operation of the seventh embodiment, in terms of a point that the I leak component output from the multiplier for I signal 12I and the Q leak component output from the multiplier for Q signal 12Q are cancelled, is the same as the third embodiment, and hence a description thereof is omitted.

Moreover, the operation of the seventh embodiment, in terms of a point that the third-order distortion components caused by the multiplier for I signal 12I and the multiplier for Q signal 12Q are cancelled, is the same as the fifth embodiment, and hence a description thereof is omitted.

According to the seventh embodiment, the leak component output from the multiplier 12 is cancelled as in the third embodiment. Moreover, it is possible to restrain the third-order distortion components caused by the multiplier for I signal 12I and the multiplier for Q signal 12Q.

Eighth Embodiment

Figure 8:
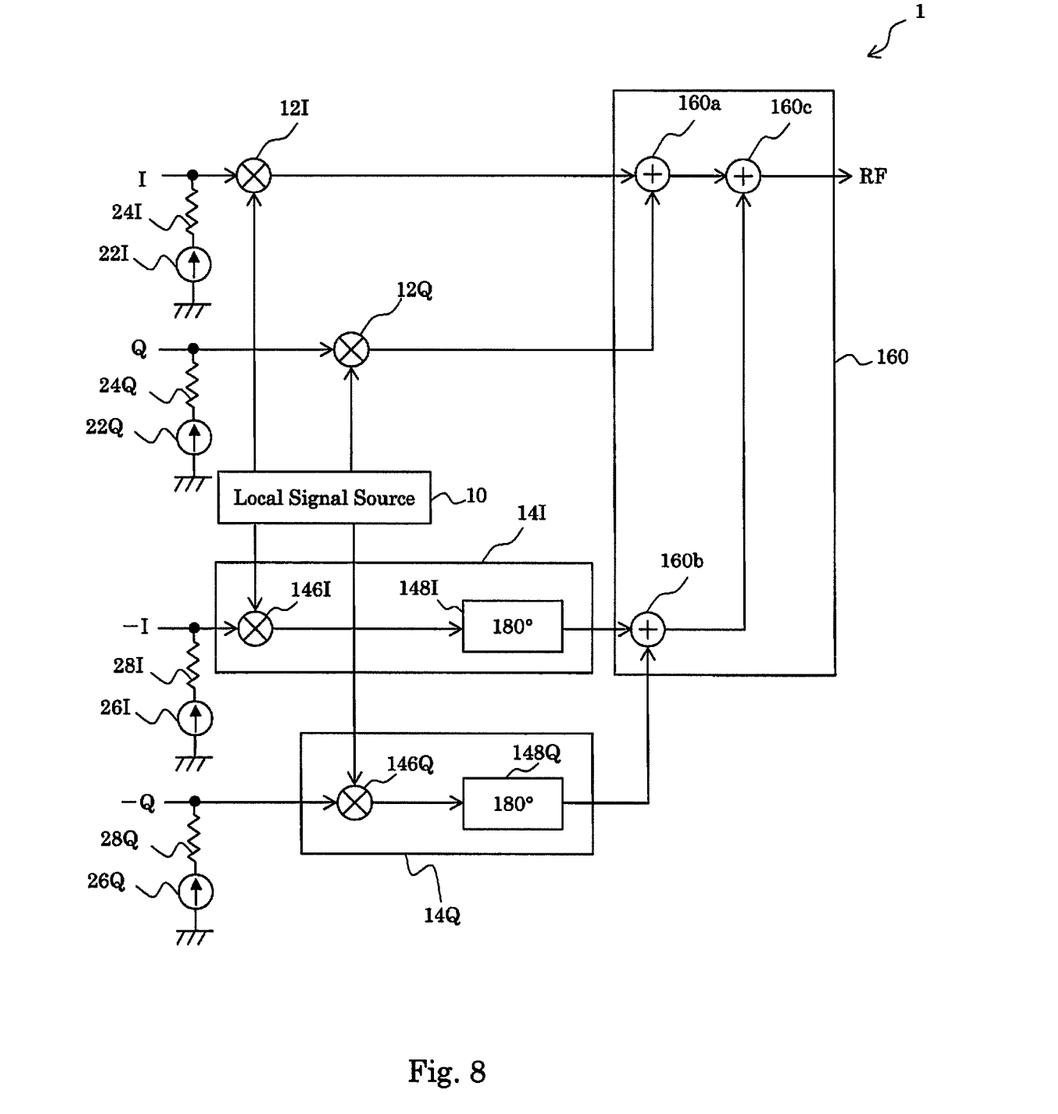
FIG. 8 is a diagram showing a configuration of a modulator 1 according to an eighth embodiment.

An eighth embodiment is a circuit in which, for restraining the third-order distortion, the first constant current source for I signal 22I, the second constant current source for I signal 26I, the first constant current source for Q signal 22Q and the second constant current source for Q signal 26Q are further provided for the modulator 1 according to the fourth embodiment. The eighth embodiment can be considered as a circuit in which the configurations of the anti-phase I leak component output unit 14I and the anti-phase Q leak component output unit 14Q according to the seventh embodiment are changed as in the seventh embodiment.

FIG. 8 is a diagram showing a configuration of the modulator 1 according the eighth embodiment. The modulator 1 includes the local signal source 10, the multiplier for I signal 12I, the multiplier for Q signal 12Q, the anti-phase I leak component output unit 14I, the anti-phase Q leak component output unit 14Q, the adding unit 160, the first constant current source for I signal 22I, the first resistor for I signal 24I, the second constant current source for I signal 26I, the second resistor for I signal 28I, the first constant current source for Q signal 22Q, the first resistor for Q signal 24Q, the second constant current source for Q signal 26Q and the second resistor for Q signal 28Q. In the following, the same components are denoted by the same numerals as of the fourth embodiment, and descriptions thereof will be omitted.

The local signal source 10, the multiplier for I signal 12I, the multiplier for Q signal 12Q, the anti-phase I leak component output unit 14I, the anti-phase Q leak component output unit 14Q and the adding unit 160 are the same as those of the fourth embodiment, and hence descriptions thereof are omitted.

The first constant current source for I signal 22I, the first resistor for I signal 24I, the second constant current source for I signal 26I and the second resistor for I signal 28I are the same as those of the seventh embodiment, and hence descriptions thereof are omitted.

The first constant current source for Q signal 22Q, the first resistor for Q signal 24Q, the second constant current source for Q signal 26Q and the second resistor for Q signal 28Q are the same as those of the seventh embodiment, and hence descriptions thereof are omitted.

An operation of the eighth embodiment, in terms of a point that the I leak component output from the multiplier for I signal 12I and the Q leak component output from the multiplier for Q signal 12Q are cancelled, is the same as the fourth embodiment, and hence a description thereof is omitted.

Moreover, the operation of the eighth embodiment, in terms of a point that the third-order distortion components caused by the multiplier for I signal 12I and the multiplier for Q signal 12Q are cancelled, is the same as the seventh embodiment, and hence a description thereof is omitted.

According to the eighth embodiment, the leak components output from the multiplier for I signal 12I and the multiplier for Q signal 12Q are cancelled as in the fourth embodiment. Moreover, it is possible to restrain the third-order distortion components caused by the multiplier for I signal 12I and the multiplier for Q signal 12Q.

I In-phase baseband I signal
Q In-phase baseband Q signal
−I Anti-phase baseband I signal
−Q Anti-phase baseband Q signal
1 Modulator
10 Local Signal Source
12 Multiplier
14 Anti-phase Leak Component Output Unit
142 Phase Inverter
144 Anti-phase Multiplier
146 Anti-phase Multiplier
148 Phase Inverter
16 Adder
12I Multiplier for I signal
12Q Multiplier for Q signal
14I Anti-phase I leak component Output Unit
142I Phase Inverter for I signal
144I Anti-phase Multiplier for I signal
146I Anti-phase Multiplier for I signal
148I Phase Inverter for I signal
14Q Anti-phase Q leak component Output Unit 142Q Phase Inverter for Q signal
144Q Anti-phase Multiplier for Q signal
146Q Anti-phase Multiplier for Q signal
148Q Phase Inverter for Q signal
160 Adding Unit
160a, 160b, 160c Adder
22 First Constant Current Source
22I First Constant Current Source for I signal
22Q First Constant Current Source for Q signal
26 Second Constant Current Source
26I Second Constant Current Source for I signal
26Q Second Constant Current Source for Q signal

The invention claimed is:

1. A modulator, comprising:

a multiplier that multiplies an in-phase baseband signal and an in-phase local signal by each other;

an anti-phase leak component outputter that outputs, based on the in-phase local signal, an anti-phase leak component equivalent to a signal obtained by inverting the phase of a leak component which is the in-phase local signal leaked from the multiplier; and an adder that adds an output from the multiplier and an output from the anti-phase leak component outputter to each other, wherein:

the anti-phase leak component outputter comprises:

an anti-phase multiplier that receives the in-phase local signal and multiplies the received in-phase local signal and a predetermined signal by each other; and a phase inverter that inverts the phase of an output from the anti-phase multiplier; and a leak characteristic of the anti-phase multiplier is identical with a leak characteristic of the multiplier.

2. The modulator according to claim 1, wherein the predetermined signal is an anti-phase baseband signal equivalent to a signal obtained by inverting the phase of the in-phase baseband signal.

* * * * *